United States Patent
Sovio et al.

(10) Patent No.: US 11,777,717 B2
(45) Date of Patent: Oct. 3, 2023

(54) METHOD FOR END ENTITY ATTESTATION

(71) Applicant: Huawei Technologies Co., Ltd., Shenzhen (CN)

(72) Inventors: Sampo Sovio, Helsinki (FI); Jan-Erik Ekberg, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 17/425,896

(22) PCT Filed: Jan. 25, 2019

(86) PCT No.: PCT/EP2019/051817
§ 371 (c)(1),
(2) Date: Apr. 18, 2022

(87) PCT Pub. No.: WO2020/151831
PCT Pub. Date: Jul. 30, 2020

(65) Prior Publication Data
US 2022/0166608 A1 May 26, 2022

(51) Int. Cl.
*H04L 9/08* (2006.01)
*H04L 9/30* (2006.01)
*H04L 9/32* (2006.01)

(52) U.S. Cl.
CPC ............ *H04L 9/0825* (2013.01); *H04L 9/302* (2013.01); *H04L 9/3242* (2013.01); *H04L 9/3252* (2013.01); *H04L 9/3268* (2013.01)

(58) Field of Classification Search
CPC ..... H04L 9/0825; H04L 9/302; H04L 9/3242; H04L 9/3252; H04L 9/3268; G06F 21/44; G06F 21/57
See application file for complete search history.

(56) References Cited

U.S. PATENT DOCUMENTS 9,514,305 B2 12/2016 Acar et al.
9,698,993 B2 7/2017 Zaverucha et al.
(Continued)

FOREIGN PATENT DOCUMENTS

CN 113302893 A * 8/2021 ............. G06F 21/44
DE 102019100334 A1 * 7/2020 ............. G06F 21/45
(Continued)

OTHER PUBLICATIONS

Fehis et al., "A Trusted Way for Encryption Key Management in Cloud Computing," AIT2S 2017: Advanced Information Technology, Services and Systems, total 6 pages (Nov. 2017).
(Continued)

*Primary Examiner* — Shahriar Zarrineh
(74) *Attorney, Agent, or Firm* — Leydig, Voit & Mayer, Ltd.

(57) ABSTRACT

A method for attestation of Control Flow Integrity (CFI) of an application running on an end entity whereby an asymmetric key pair is generated by a Key Management Module (KMM) comprising a private key and a public key, then the public key is signed with a device key unique to the end entity thereby generating a public key certificate which attests to the private key being in possession of the end entity. The asymmetric key pair is based on the executing code of the application and the device key. The attestation claims regarding CFI of the application are signed by the private key in a dedicated signature module.

17 Claims, 4 Drawing Sheets

(56) References Cited

U.S. PATENT DOCUMENTS

| | | | | |
|---|---|---|---|---|
| 10,263,787 B1* | 4/2019 | Gelman | ................ | G06F 21/335 |
| 10,944,558 B2* | 3/2021 | Lu | ..................... | H04W 12/0433 |
| 2006/0117177 A1* | 6/2006 | Buer | ..................... | H04L 9/0897 |
| | | | | 713/155 |
| 2007/0014398 A1* | 1/2007 | Eldridge | ............... | H04L 9/0869 |
| | | | | 380/44 |
| 2008/0285746 A1* | 11/2008 | Landrock | ............. | H04L 9/3247 |
| | | | | 380/29 |
| 2009/0144825 A1* | 6/2009 | Schluessler | ............ | G06F 21/53 |
| | | | | 726/23 |
| 2010/0037068 A1* | 2/2010 | Murase | ................ | H04L 9/3263 |
| | | | | 713/193 |
| 2012/0151223 A1 | 6/2012 | Conde Marques et al. | | |
| 2014/0095886 A1 | 4/2014 | Futral | | |
| 2015/0135313 A1* | 5/2015 | Wesie | ..................... | G06F 21/51 |
| | | | | 726/22 |
| 2016/0072785 A1* | 3/2016 | Statica | ................ | H04L 63/0421 |
| | | | | 713/155 |
| 2016/0210216 A1* | 7/2016 | Monahan | ............ | G06F 11/3093 |
| 2016/0275461 A1 | 9/2016 | Sprague et al. | | |
| 2017/0063975 A1* | 3/2017 | Prakash | .............. | H04L 67/1001 |
| 2017/0310647 A1* | 10/2017 | Hu | ......................... | G06F 21/33 |
| 2018/0083981 A1* | 3/2018 | Arunkumar | ............. | H04L 67/10 |
| 2018/0234255 A1* | 8/2018 | Fu | ............... | H04L 9/30 |
| 2018/0239897 A1* | 8/2018 | Ventura | ................... | G06F 21/57 |
| 2019/0013939 A1* | 1/2019 | Benson | ................. | H04L 9/3268 |
| 2019/0020647 A1* | 1/2019 | Sinha | ..................... | H04L 9/006 |
| 2019/0036688 A1* | 1/2019 | Wasily | ................. | H04L 9/3231 |
| 2019/0065725 A1* | 2/2019 | Liderman | ............... | G06F 21/33 |
| 2019/0081797 A1* | 3/2019 | Bos | ........................ | H04L 9/0643 |
| 2019/0379540 A1* | 12/2019 | Liderman | ............... | G06F 21/33 |
| 2020/0050798 A1* | 2/2020 | Jiang | .................... | H04L 9/3247 |

FOREIGN PATENT DOCUMENTS

| | | | | |
|---|---|---|---|---|
| EP | 3346415 A2 | 7/2018 | | |
| WO | WO-03032126 A2 * | 4/2003 | ............ | G06F 21/31 |
| WO | 2011119985 A2 | 9/2011 | | |
| WO | WO-2019029817 A1 * | 2/2019 | ............ | G06F 21/57 |

OTHER PUBLICATIONS

Qualcomm Technologies, Inc., "Pointer Authentication on ARMv8. 3, Design and Analysis of the New Software Security Instructions," total 12 pages (Jan. 2017).

\* cited by examiner

METHOD FOR END ENTITY ATTESTATION

CROSS-REFERENCE TO RELATED APPLICATIONS

This application is a national stage of International Application No. PCT/EP2019/051817, filed on Jan. 25, 2019, which is hereby incorporated by reference in its entirety.

TECHNICAL FIELD

The disclosure relates to data security, more particularly to methods and systems for attestation of Control Flow Integrity (CFI) of an application running on an end entity.

BACKGROUND

End Entity Attestation is a procedure where a relying party, such as network server, verifies certain properties of the entity that is requesting the service. For example, the end entity can be a Digital Rights Management (DRM) compliant mobile device that is trustworthy enough for decrypting content in a secure manner. In this DRM example, the relying party (e.g. a DRM license server) may want to verify that the mobile device in list of trustworthy vendors (e.g. the property.vendor.ID of the device is not tampered with).

Another typical property that is attested is whether a private key is in possession of a Trusted Execution Environment (TEE).

A third example of such property to be attested is the configuration of a device itself. An existing solution for this kind of attestation is developed by Trusted Computing Group (TCG), wherein a Trusted Platform Module (TPM) in a device monitors the boot procedure and measures all software processes that are executed during booting of the device. These measurements are recorded and accumulated into so-called Platform Configuration Registers (PCRs). The TPM provides a way to extract TPM-signed PCR values for a relying party, which can then validate whether the PCRs are matching with a known and approved configuration.

There exists a further need for attestation of Control Flow Integrity (CFI) of an application, in other words proving for a relying party that the running code of an application is not modified by an attacker. According to one known approach to solve this problem it is attested that a device vendor can be trustworthily recognized, and then the relying party simply trusts the vendor that it has provided enough countermeasures against tampering with the CFI. Such countermeasures can use Pointer Authentication (PA) against Return Oriented Programming (ROP) or measuring certain segments of the application code using a TEE. According to another known approach a TEE is used to sign evidence that these countermeasures are actually implemented.

The problem with the first approach is that it is a very complex security problem to recognize and to fix tampered CFI due to its oftentimes hardware related origin, like in the case of a Spectre or Meltdown attack wherein critical vulnerabilities in modern processors are exploited. While applications are typically not permitted to read data from other applications, a malicious program can exploit Meltdown and Spectre to get hold of secrets stored in the memory of other running programs, such as passwords stored in a password manager or browser, personal photos, emails, instant messages and even business-critical documents. Therefore, it is not reasonable to assume that vendors simply do not have CFI problems and their best effort is good enough to prevent malicious attacks.

The problem with the second approach is that it requires the device to have a TEE configured. In addition, the TEE must be attestable, and should implement a service to verify the integrity of the application in question.

SUMMARY

It is an object to provide an improved method and apparatus for generating verifiable attestation claims about the Control Flow Integrity (CFI) of an application that eliminates or reduces the problems mentioned above.

The foregoing and other objects are achieved by the features of the independent claims. Further implementation forms are apparent from the dependent claims, the description and the figures.

According to a first aspect, there is provided a computer-implemented method for attestation of Control Flow Integrity (CFI) of an application running on an end entity, the method comprising:

generating an asymmetric key pair based on the executing code of the application and a device key unique to the end entity, the asymmetric key pair comprising a private key and a public key, generating a public key certificate by signing the public key with the device key, wherein the public key certificate attests to the private key being in possession of the end entity, generating attestation claims regarding CFI of the application, signing the attestation claims by the private key, and validating the signature of the attestation claims by a relying party using the public key certificate, wherein the relying party is not part of the end entity.

By using a device key unique to the end entity and the executing code of the application in the above described manner it becomes possible to generate verifiable attestation claims about the Control Flow Integrity (CFI) of the application without the need to configure a Trusted Execution Environment on the end entity. Thus, the method provides a cost efficient way to build a lightweight signing and attestation service using mainly existing hardware blocks on a device.

Furthermore, when executing the steps as described above the unique device key is never shared with the application itself, nor is it shared with the relying party, thus increasing the security and privacy of the attestation method. This is a benefit especially in high-complexity applications, whereby the public key certificate provides sufficient proof that the private key is in possession of the particular end entity. Thus, the relying party gets hardware- and kernel-level proof that the application is measured (unmodified), and the device identity is determined.

In one embodiment the relying party and the end entity are both included in the same physical device.

In another embodiment the relying party and the end entity are, or are part of, physically different devices.

In another embodiment the private key is provisioned in the kernel of the end entity, which then performs the signature operation of the attestation claims.

In another embodiment the private key is provisioned in a TEE configured in a secure area of a processor of the end entity, which then performs the signature operation of the attestation claims.

In another embodiment a Key Management Module (KMM) is provisioned as part of the end entity, wherein the KMM is configured to generate the asymmetric key pair and to generate the public key certificate. In an embodiment the KMM is further configured to securely inject the private key into a separate module dedicated to attestation claim signing.

In a further possible implementation form of the first aspect generating the asymmetric key pair is based on a secure hash calculated from the text segment of the executing code of the application, In one embodiment the secure hash is calculated using a keyed-hash function h, such as HMAC-SHA256, from the text segment (TEXT) of the application code as h=SHA256 (TEXT).

In another embodiment the application code further comprises an elf header (HEAD) and one or more other segments (OTHER).

In another embodiment a dedicated Key Management Module is provisioned as part of the end entity, wherein the KMM is configured to initiate application code measurement.

In a further possible implementation form of the first aspect the attestation claims are generated in the form of an application attestation token (AAT), the AAT comprising an identifier for the application (app_id), an identifier for the end entity (device_id), the public key certificate (cert), and the signature by the private key (signature).

In one embodiment the AAT is constructed as follows:
app_id|device_id[|other-info]|signature|cert where notation "|" refers to concatenation and notation "[ ]" refers to an optional element. The app_id, device_id and other-info are relevant identifiers for the end entity that is attested, and signature is the signature of these identifiers signed by the private key.

In a further possible implementation form of the first aspect the method further comprises:
validating the public key certificate by the relying party before validating the signature of the attestation claims.

In one embodiment the relying party validates the certificate and subsequently uses the certificate for validating the signature of the attestation claims.

In a further possible implementation form of the first aspect both the private key and the public key is generated as a sequence of pairs, wherein the private key is generated as blocks of Pseudo-Random bytes in the form of $$((x\_1, y\_1), \ldots, (x\_k, y\_k)),$$

and wherein the public key is calculated from the private key according to the formula $$(f_1(x\_1), f_1(y\_1)), \ldots, (f_1(x\_k), f_1(y\_k)),$$

where $f_1$ refers to a one-way function, and k refers to the security level.

In one embodiment the private key is generated as 2k*n blocks of Pseudo-Random bytes, where n is output length of one-way function $f_1$.

In a further possible implementation form of the first aspect the attestation claims are signed by the private key using an asymmetric signing algorithm, such as the Rivest-Shamir-Adleman (RSA) algorithm, the Digital Signature Algorithm (DSA), or the Elliptic Curve Digital Signature Algorithm (ECDSA).

In a further possible implementation form of the first aspect generating the asymmetric key pair is further based on a random nonce value; wherein the private key is derived from a device secret, where the device secret is calculated as a one-way function $f_2$ using the executing code, the random nonce value, and the device key as variables as follows:

secret=$f_2$(code, nonce, priv_dev);
wherein the one-way function $f_2$ uses the QARMA cipher or a keyed-hash function such as HMAC-SHA256.

Using a random nonce value eliminates the need for carrying out the arithmetical operations needed to calculate RSA, ECDSA or DSA operations, which would require relatively complex logic in software or hardware to be implemented. The random nonce guarantees that the signature will always be done with fresh key.

In a further possible implementation form of the first aspect the pairs of private key and the public key are generated using Elliptic Curve Cryptography (ECC) or the RSA algorithm, and the method further comprises:
generating an additional, random, asymmetric key pair comprising a random private key and a random public key, and generating a random public key certificate by signing the random public key with the private key using an asymmetric signing algorithm such as the RSA, DSA, or ECDSA, wherein the attestation claims are signed by the random private key.

This implementation form can be applied in such cases when the generated asymmetric key pair based on the executing code and device key is not suitable for signing the attestation claims, but the key pair can be generated as an ECC or RSA key pair. In this embodiment the random nonce is not needed, because additional keypair is randomly generated and is useful for providing a one-time signature scheme.

In one embodiment a dedicated Key Management Module (KMM) is provisioned as part of the end entity, wherein the KMM is configured as a separate entity to generate the asymmetric key pair and the additional, random asymmetric key pair as RSA or ECC keys.

In a further possible implementation form of the first aspect the attestation claims are generated in the form of a random application attestation token (RAAT), the random application attestation token comprising an identifier for the application (app_id), an identifier for the end entity (device_id), the random public key certificate (cert_pack), the public key certificate (cert), the random public key (pack_pub_app), and the signature by the private key (signature).

In one embodiment the RAAT is constructed as follows:
app_id|device_id[|other-info]|pack_pub_app|signature-|cert_pack|cert where notation "|" refers to concatenation and notation "[ ]" refers to an optional element. The app_id, device_id and other-info are relevant identifiers for the end entity that is attested, and signature is the signature of these identifiers signed by the private key.

In a further possible implementation form of the first aspect the attestation claims are signed by securely injecting the private key or the random private key into a signature module (SM) dedicated to attestation claim signing.

In this embodiment the attestation claims are not signed by directly by the private key, which eliminates the need for additional logic to implement an asymmetric signing function. In constrained environments where a hardware module exists to host this signature function this can be seen significant advantage.

In a further possible implementation form of the first aspect the signature module is an extension of a Pointer Authentication (PA) engine, wherein the PA engine uses QARMA cipher for generating Pointer Authentication Code (PAC), and wherein, after generating the public key certificate, a one-way function $f_3$ of the private key or the random private key the is set as a Pointer Authentication Key (PAK).

According to this implementation the relying party gets evidence that the data was signed by using a derivative of the PA key. This signature scheme requires minimal extra logic if the PA engine is present, because the QARMA primitive already exists on the hardware. Thus, only additional software might be needed, and no new kernel interfaces are required for signing. Furthermore, using QARMA cipher results in shorter keys and shorter signatures than using traditional hash functions.

In a further possible implementation form of the first aspect the attestation claims are signed following a Lamport one-time signature scheme, wherein the signature of the bit string $m\_1 \ldots m\_k$ is $z\_1 \ldots z\_k$, where $z\_i = x\_i$ if $m\_i = 0$ and
$z\_i = y\_i$ if $m\_i = 1$; and
the validating the signature comprises checking that
$f_4(z\_i) = f_4(x\_i)$ when $m\_i = 0$ and
$f_4(z\_i) = f_4(y\_i)$ when $m\_i = 1$,
where $f_4$ refers to a one-way function.

In one embodiment k is the size of the one-way function output in bits (typically 256, $f_4$=SHA256), and the private key and the public key both comprises a sequence k pairs.

In another embodiment a random nonce value is used for generating the asymmetric key pair, whereby the random nonce guarantees that the signature will always be done with fresh key.

In a further possible implementation form of the first aspect the QARMA cipher is used as the one-way function $f_4$.

According to a second aspect, there is provided a computer-based system comprising a relying party, and
an end entity connected to the relying party;
the end entity comprising a processor,
a storage medium connected to the processor, and
an assigned unique device key, wherein
the storage medium is configured to store the executing code of an application, and remote attestation instructions, wherein
when the remote attestation instructions are executed by the processor they cause the end entity and the relying party to perform a method according to any one of the possible implementation forms of the first aspect.

By using a device key unique to the end entity and the executing code of the application together with remote attestation instructions executed by a processor it becomes possible to generate verifiable attestation claims about the Control Flow Integrity (CFI) of the application without the need to configure a Trusted Execution Environment on the end entity. Furthermore, with this setup the unique device key is never shared with the application itself, nor is it shared with the relying party, thus increasing the security and privacy of the attestation method. This is a benefit especially in high-complexity applications.

In one embodiment both the relying party and the end entity are both included in the same physical device.

In another embodiment the relying party and the end entity are, or are part of, physically different devices.

In another embodiment the end entity is provisioned with a kernel configured to performs the signature operation of the attestation claims.

In another embodiment the end entity is provisioned with a TEE configured in a secure area of a processor of the end entity, wherein the TEE is configured to which perform the signature operation of the attestation claims.

In a possible implementation form of the second aspect the end entity further comprises a Key Management Module (KMM) configured for generating an asymmetric key pair based on the executing code, the device key, and an optional random nonce value, the asymmetric key pair comprising a private key and a public key; and
generating a public key certificate by signing the public key with the device key.

Using a dedicated module for generating asymmetric key pairs and certificates of public keys ensures efficient and secure operation of the end entity. Using a random nonce value can eliminate the need for carrying out the arithmetical operations needed to calculate RSA, ECDSA or DSA operations, which would require relatively complex logic in software or hardware to be implemented. The random nonce guarantees that the signature will always be done with fresh key.

In an embodiment the KMM is further configured to securely inject the private key into a separate module dedicated to attestation claim signing.

In another embodiment the KMM is configured to initiate measurement of the application code. In one embodiment the KMM is further configured to generate the secure hash from the text segment of the application code.

In a further possible implementation form of the second aspect the end entity further comprises a Signature Module (SM) dedicated to attestation claim signing, and configured for generating attestation claims regarding CFI of the application, optionally in the form of an application attestation token (AAT), and
signing the attestation claims after receiving the private key from the KMM by secure injection.

In this embodiment the attestation claims are not signed by directly by the private key, which eliminates the need for additional logic to implement an asymmetric signing function. In constrained environments where a hardware module exists to host this signature function this can be seen significant advantage.

In one embodiment the signature module is an extension of a Pointer Authentication (PA) engine.

In this case the relying party gets evidence that the data was signed by using a derivative of the PA key. This signature scheme requires minimal extra logic if the PA engine is present. Only additional software might be needed, and no new kernel interfaces are required for signing. In one embodiment QARMA cipher is used for generating signatures, which results in shorter keys and shorter signatures than using traditional hash functions.

In a further possible implementation form of the second aspect the KMM is further configured for generating an additional, random, asymmetric key pair comprising a random private key and a random public key, and
generating a random public key certificate by signing the random public key with the private key using an asymmetric signing algorithm such as the RSA, DSA, or ECDSA,
wherein the signature module is further configured for
signing the attestation claims after receiving the random private key from the key management module.

This implementation form can be applied in such cases when the generated asymmetric key pair based on the executing code and device key is not suitable for signing the attestation claims, but the key pair can be generated as an ECC or RSA key pair. In this embodiment the random nonce is not needed, because additional keypair is randomly generated and is useful for providing a one-time signature scheme.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1:
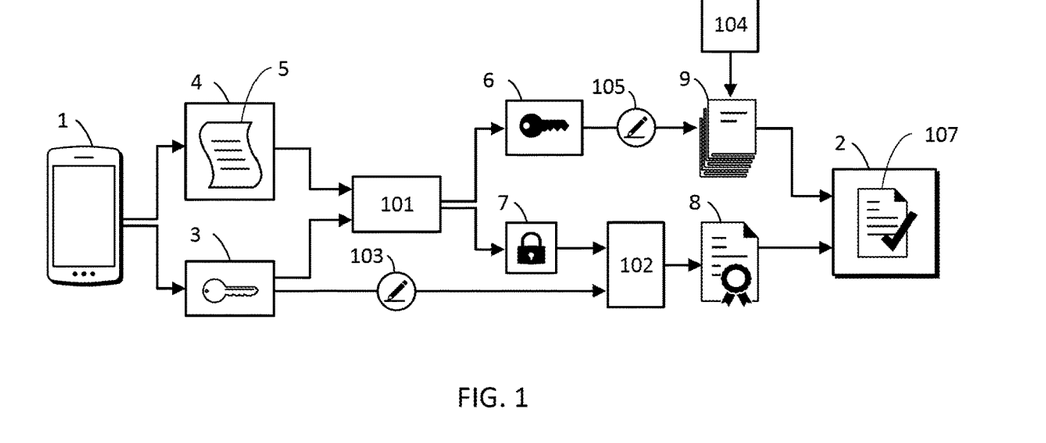
FIG. 1 shows a flow diagram of a method in accordance with one embodiment of the first aspect.

FIG. 1 illustrates the core elements and steps of a method of Control Flow Integrity (CFI) attestation of an application running on an end entity in accordance with the first aspect. At a high level, CFI restricts the control-flow of an application to valid execution traces. CFI enforces this property by monitoring the program at runtime and comparing its state to a set of precomputed valid states. If an invalid state is detected, an alert is raised, usually terminating the application. Thus, the method is capable of proving for a relying party that the running code of an application is not modified by an attacker.

An attestation claim is a statement an end entity makes about itself in order to establish access to a service or other entity, wherein an end entity can be any type of computer-based device capable of running an application, for example a mobile device such as a smartphone. A relying party is a term usually used to refer to a server providing access to a secure software application, however, in this context the relying party can be any entity that is not part of the end entity and that is capable of accepting and validating attestation claims.

The method uses the executing code 5 of the application 4 that needs its CFI attested, and a device key 3 unique to the end entity 1 on which the application is executed to generate in a first step 101 an asymmetric key pair comprising a private key 6 and a public key 7.

The asymmetric key pair is generated according to the principles of asymmetric cryptography (also known as public-key cryptography), whereby public keys may be disseminated widely, and private keys are known only to the owner. The generation of the keys depends on cryptographic algorithms based on mathematical problems to produce one-way functions. Effective security only requires keeping the private key 6 private; the public key 7 can be openly distributed without compromising security.

In a next step 102 a public key certificate 8 is generated. This step comprises signing 103 the public key 7 with the device key 3. The public key certificate 8 can attest to the private key 6 being in possession of the end entity 1.

The public key certificate is an electronic document that can be used to prove the ownership of a public key, and an associated private key. The certificate includes information about the key, information about the identity of its owner, and the digital signature of an entity that has verified the certificate's contents. If the signature is valid, and the software examining the certificate trusts the issuer, then it can use that key to communicate securely with the certificate's subject.

In a next step 104 the attestation claims 9 regarding CFI of the application 4 are generated, and subsequently signed 105 by the private key 6. In one embodiment the attestation claims 9 are signed by the private key 6 using an asymmetric signing algorithm, such as the Rivest-Shamir-Adleman RSA algorithm, the Digital Signature Algorithm DSA, or the Elliptic Curve Digital Signature Algorithm ECDSA.

In a next step 107 the signature of the attestation claims 9 is validated by a relying party 2, using the public key certificate 8.

In one embodiment both the relying party and the end entity are both included in the same physical device.

In one embodiment the relying party and the end entity are, or are part of, physically different devices.

In another embodiment the private key is provisioned in the kernel of the end entity, which then performs the signature operation of the attestation claims.

In one embodiment both the private key 6 and the public key 7 is generated as a sequence of pairs, wherein the private key 6 is generated as blocks of Pseudo-Random bytes in the form of $((x\_1, y\_1), \ldots, (x\_k, y\_k))$. In one embodiment the private key is generated as $2k*n$ blocks of Pseudo-Random bytes, where n is output length of one-way function $f_1$. The public key 7 is then calculated from the private key 6 according to the formula:

$$((f_1(x\_1), f_1(y\_1)), \ldots, (f_1(x\_k), f_1(y\_k)),$$

where $f_1$ refers to a one-way function, and k refers to the security level. Possibilities for the one-way functions are the QARMA cipher or a keyed-hash hash function like HMAC-SHA256.

QARMA is a family of lightweight tweakable block ciphers developed by Qualcomm, where tweakable means that the permutation computed by the cipher on a plaintext is determined by a secret key and an additional user selectable tweak. QARMA is targeted to a very specific set of use cases such as the generation of very short tags by truncation, and it is also designed to be suitable for memory encryption, and the construction of keyed-hash functions. It is meant to be used in fully unrolled hardware implementations.

A hash function is any function that can be used to map data of arbitrary size to data of a fixed size. The values returned by a hash function are called hash values, hash codes, digests, or simply hashes. A keyed (cryptographic) hash function is a special class of hash function that has certain properties which make it suitable for use in cryptography. It is a mathematical algorithm that maps data of arbitrary size to a bit string of a fixed size (a hash) and is designed to be a one-way function, that is, a function which is infeasible to invert.

Figure 2:
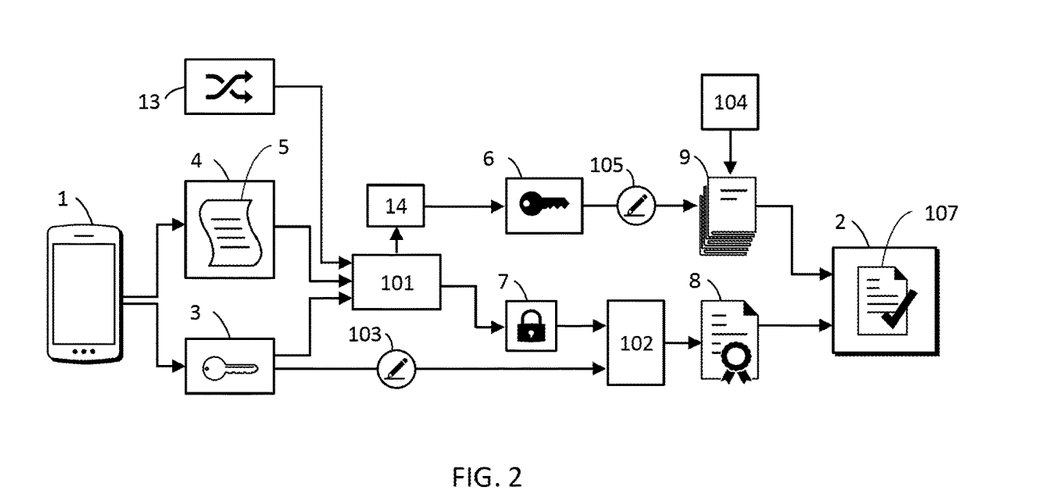
FIG. 2 shows a flow diagram of a method in accordance with another embodiment of the first aspect.

FIG. 2 shows a flow diagram illustrating a possible implementation of the method, wherein generating the asymmetric key pair is further based on a random nonce value 13. In this implementation, steps and features that are the same or similar to corresponding steps and features previously described or shown herein are denoted by the same reference numeral as previously used for simplicity.

This method further differs from the previous implementation in that the private key 6 is derived from a device secret 14, where the device secret 14 is calculated as a one-way function $f_2$ using the executing code 5, the random nonce value 13, and the device key 3 as variables as follows:

secret=$f_2$(code, nonce, priv_dev);

wherein the one-way function $f_2$ uses the QARMA cipher or a keyed-hash function such as HMAC-SHA256.

The nonce is an arbitrary number that can be used just once in one cryptographic communication. It can be a random or pseudo-random number to ensure that old communications cannot be reused in replay attacks. The inclusion of this random nonce as variable guarantees that the signature will always be done with fresh key.

Figure 3:
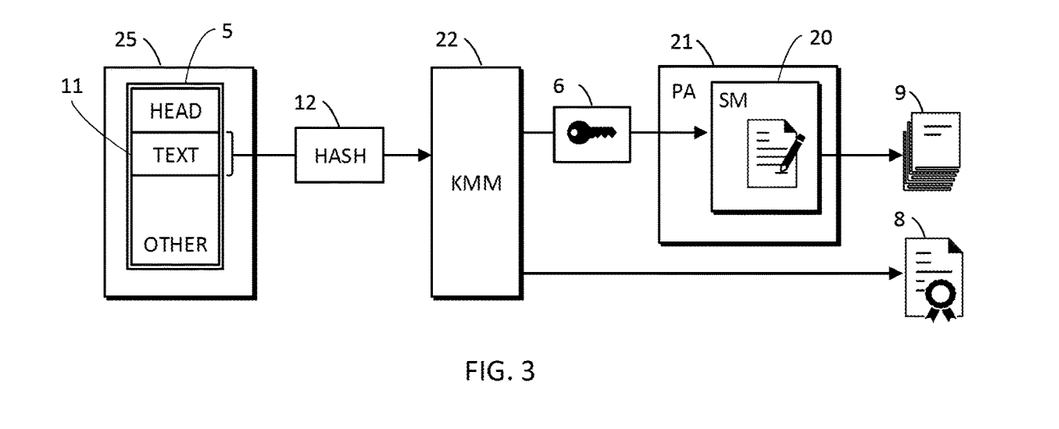
FIG. 3 shows a flow diagram of a method in accordance with another embodiment of the first aspect.

FIG. 3 shows a flow diagram illustrating a possible implementation of the method, wherein a dedicated Key Management Module (KMM) 22 is provisioned as part of the end entity 1. In this implementation, steps and features that are the same or similar to corresponding steps and features previously described or shown herein are denoted by the same reference numeral as previously used for simplicity. In a first step the application's executing code 5 is loaded in the memory 25 of the end entity 1 for execution. The KMM 22 then initiates measurement of the application code, wherein the text segment (TEXT) 11 of the executing code 5 of the application 4 is used to calculate a secure hash (HASH) 12, preferably using keyed-hash function such as HMAC-SHA256 as follows: h=SHA256(TEXT). The application code 5 can further comprise an elf header (HEAD) and one or more other segments (OTHER) that are however not used for calculating the secure hash.

The KMM 22 then generates the private key 6 (as part of an asymmetric key pair) and securely injects this private key 6 into a Signature Module (SM) 20 dedicated to generating and signing attestation claims 9. The KMM also generates the public key certificate 8 (by signing the public key 7 with the device key 3), which public key certificate 8 attests to the private key 7 being in possession of the end entity 1.

The signature module 20 in this embodiment is an extension of a Pointer Authentication (PA) engine 21. Pointer Authentication (PA) is a technology developed to protect CFI of an application and works based on the principle that when the application code is executed on a device the PA engine validates Pointer Authentication Codes (PACs) from instructions, so the device itself gains assurance that the application code is not under run-time attack. The PA technology uses the QARMA cipher for generating a Pointer Authentication Code (PAC). When used for Pointer Authentication, two inputs to QARMA are the pointer and the context. The PAC is the truncated output of QARMA.

The extended PA engine with the Signature Module (SM) 20 according to this embodiment uses a new asymmetric scheme that is based on the QARMA cipher (or any one-way function) which can compute symmetric authentication tags. Examples of such functions are keyed-hash functions.

Figure 4:
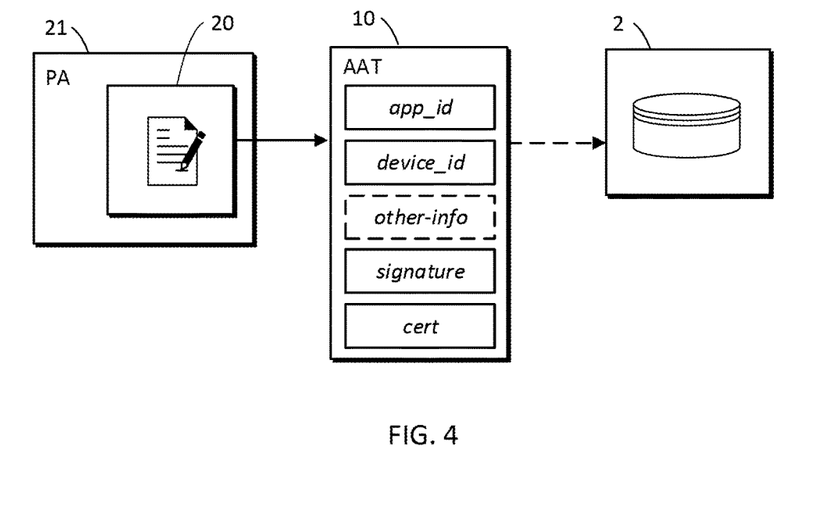
FIG. 4 shows a flow diagram of a part of a method in accordance with another embodiment of the first aspect.

FIG. 4 shows a flow diagram illustrating a possible implementation of the method, wherein the attestation claims 9 are generated in the form of an application attestation token AAT 10, the AAT 10 comprising an identifier for the application 4 (app_id), an identifier for the end entity 1 (device_id), the public key certificate 8 (cert), and the signature by the private key (signature) 6. The app_id, device_id and other-info are relevant identifiers for the end entity that is attested, and signature is the signature of these identifiers signed by the private key.

In one embodiment the AAT is constructed as follows:
app_id|device_id[|other-info]|signature|cer≠ where notation "|" refers to concatenation and notation "[ ]" refers to an optional element.

Figure 5:
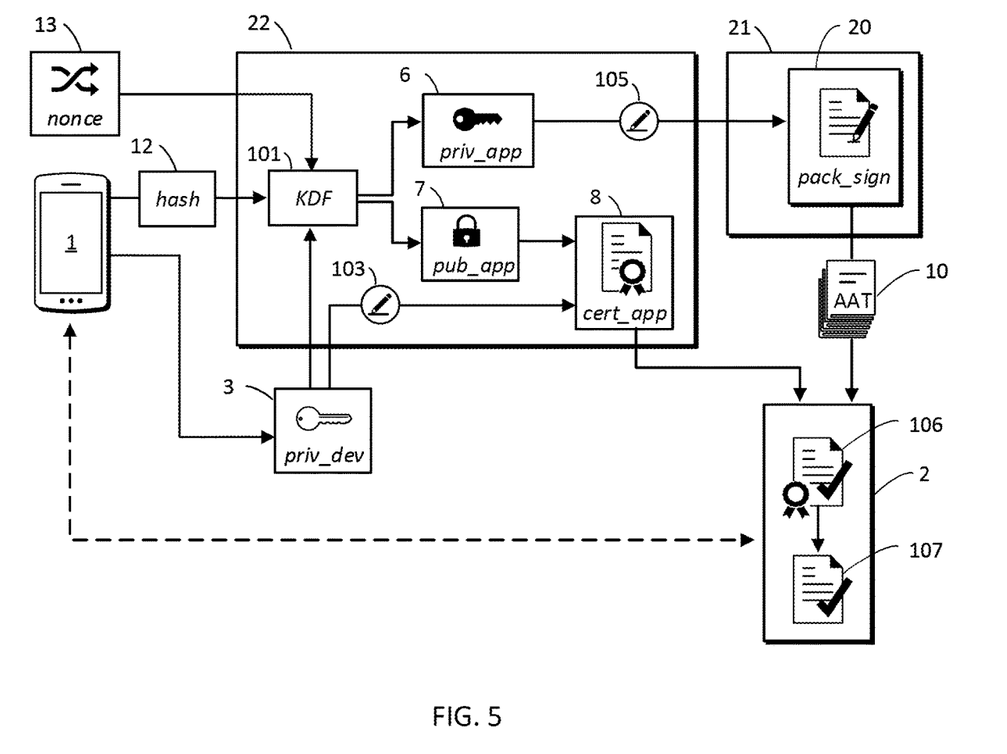
FIG. 5 shows a flow diagram of a method in accordance with another embodiment of the first aspect.

FIG. 5 shows a flow diagram illustrating a possible implementation of the method, wherein the Key Management Module (KMM) 22 runs a Key Derivation Function (KDF). In this implementation, steps and features that are the same or similar to corresponding steps and features previously described or shown herein are denoted by the same reference numeral as previously used for simplicity.

The KDF is responsible for the tasks of derivation 101 of the asymmetric application specific key pair (pub_app, priv_app) from the secure hash 12 (hash) and the device secret 14. The KMM 22 then initiates generation of the public key certificate 8 (cert_app) using the application specific public key 7 (pub_app) and using the device key 3 (priv_dev), which public key certificate 8 (cert_app) may be further certified by a trusted $3^{rd}$ party.

The KMM 22 also ensures securely injection of the private key 6 (priv_app) into the Signature Module (SM) 20 which is using a dedicated algorithm (called pack_sign) for signing the application attestation token AAT 10.

The relying party 2 can then validate 106 the public key certificate 8 (cert_app) and use the validated public key certificate 8 for validating 107 the signature of the AAT 10. After the validations the results can be shared with the end entity 1 or a $3^{rd}$ party service.

Figure 6:
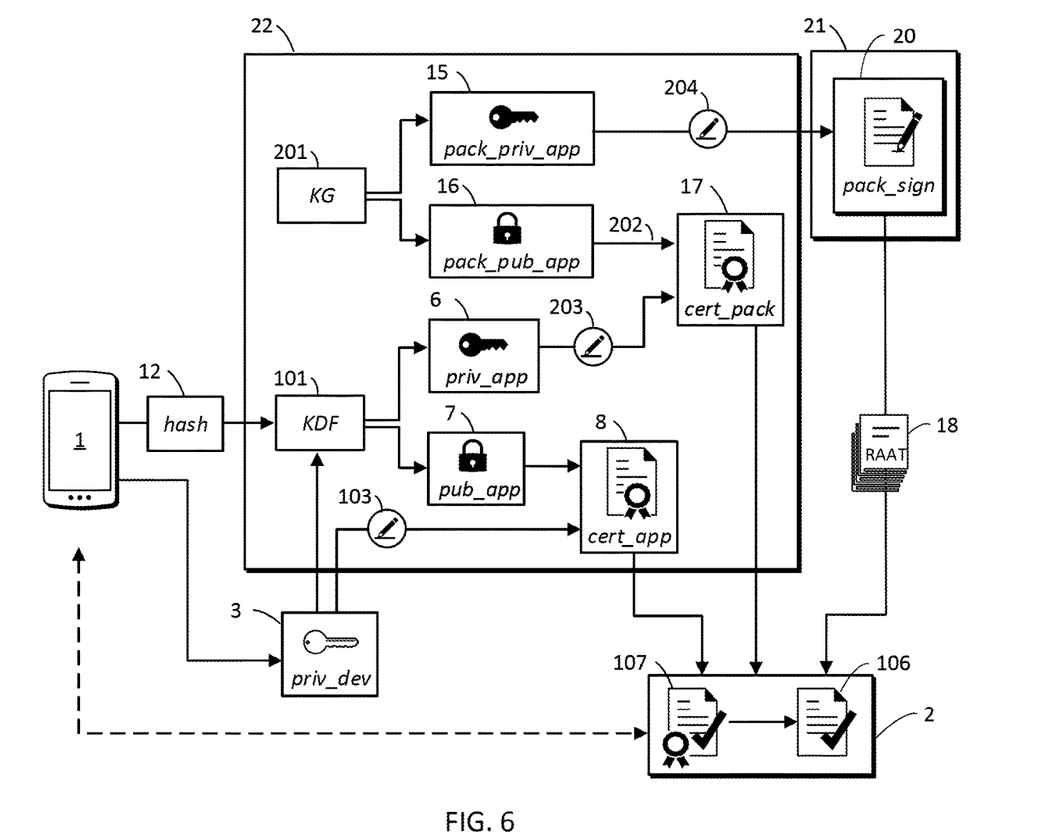
FIG. 6 shows a flow diagram of a method in accordance with another embodiment of the first aspect.

FIG. 6 shows a flow diagram illustrating a further possible implementation of the method, wherein the pairs of the private key 6 and the public key 7 are generated using Elliptic Curve Cryptography ECC or the RSA algorithm. In this implementation, steps and features that are the same or similar to corresponding steps and features previously described or shown herein are denoted by the same reference numeral as previously used for simplicity.

This method further differs from the previous implementation in that it comprises generating 201 an additional, random, asymmetric key pair comprising a random private key 15 (pack_priv_app) and a random public key 16 (pack_pub_app), and generating 202 a random public key certificate 17 (cert_pack) by signing 203 the random public key 16 (pack_pub_app) with the private key 6 (priv_app) using an asymmetric signing algorithm such as the RSA, DSA, or ECDSA. The attestation claims in this implementation are generated in the form of a random application attestation token (RAAT) 18 and are signed 204 by the random private key 15 (pack_priv_app).

The relying party 2 can then validate 106 the public key certificate 8 (cert_app) and the random public key certificate 17 (cert _pack) and use these validated certificates for validating 107 the signature of the RAAT 18. After the validations the results can be shared with the end entity 1 or a $3^{rd}$ party service.

In one embodiment the pack_sign function is implemented by following construction from Lamport One-Time signature scheme, wherein the signature of the bit string $m\_1 \ldots m\_k$ is $z\_1 \ldots z\_k$, where k is the size of the one-way function output in bits (typically 256, f=SHA256), and the private key 6 and the public key 7 both comprises a sequence of k pairs;

$z\_i = x\_i$ if $m\_i = 0$ and
$z\_i = y\_i$ if $m\_i = 1$; and the validating the signature 106 comprises checking that
$f_4(z\_i)=f_4(x\_i)$ when $m\_i=0$ and
$f_4(z\_i)=f_4(y\_i)$ when $m\_i=1$,
where $f_4$ refers to a one-way function.

Figure 7:
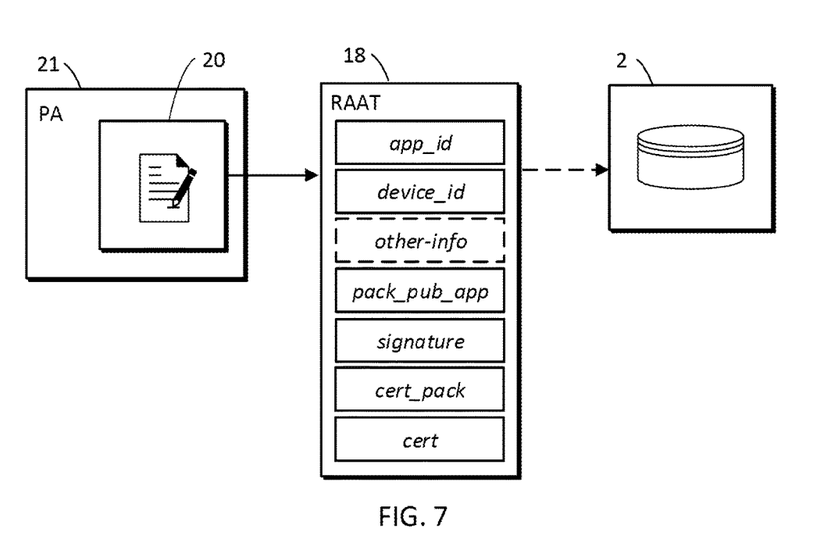
FIG. 7 shows a flow diagram of a part of a method in accordance with another embodiment of the first aspect.

FIG. 7 shows a flow diagram illustrating a possible implementation of the method, wherein the attestation claims 9 are generated in the form of a random application attestation token (RAAT) 18, the RAAT comprising an identifier for the application 4 (app_id), an identifier for the end entity 1 (device_id), the random public key certificate 17 (cert_pack), the public key certificate 8 (cert), the random public key 16 (pack_pub_app), and the signature by the private key 6 (signature). The app_id, device_id and other-info are relevant identifiers for the end entity that is attested, and signature is the signature of these identifiers signed by the private key.

In one embodiment the RAAT is constructed as follows:
app_id|device_id[|other-info]|pack_pub_app|signature|cert_pack|cert
where notation "|" refers to concatenation and notation "[ ]" refers to an optional element.

Figure 8:
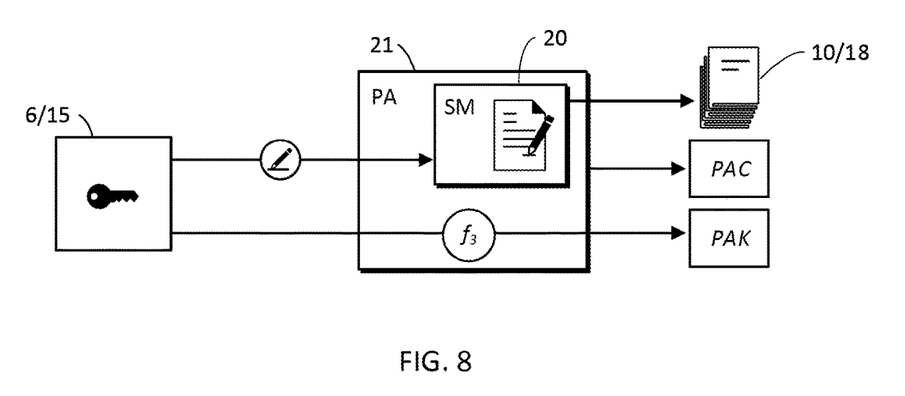
FIG. 8 shows a flow diagram of a part of a method in accordance with another embodiment of the first aspect.

FIG. 8 shows a flow diagram illustrating a possible implementation of the method, wherein the Signature Module (SM) 20 is an extension of a Pointer Authentication (PA) engine 21, and wherein the PA engine 21 uses the QARMA cipher for generating a Pointer Authentication Code (PAC). In this implementation, steps and features that are the same or similar to corresponding steps and features previously described or shown herein are denoted by the same reference numeral as previously used for simplicity.

After generating the public key certificate 8, a one-way function $f_3$ of the private key 6 or the random private key 15 is set as a Pointer Authentication Key (PAK).

The attestation claims are generated in the form of an application attestation token (AAT) 10 or a random application attestation token (RAAT) 18 and are signed by securely injecting the private key 6 or the random private key 15 into the Signature Module (SM) 20.

Figure 9:
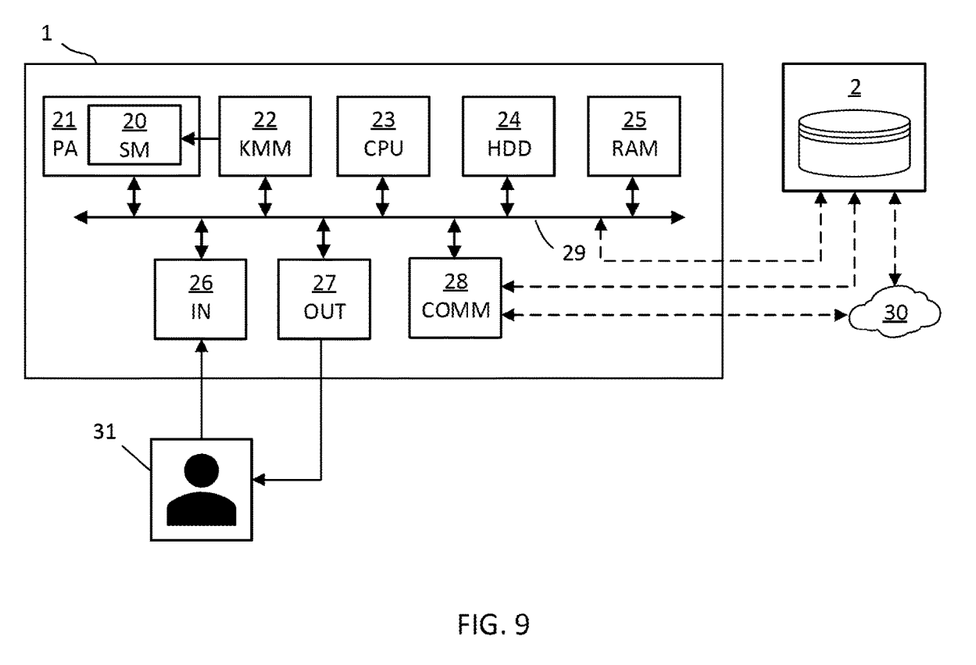
FIG. 9 shows a block diagram of a computer-based system in accordance with one embodiment of the second aspect.

FIG. 9 shows a block diagram illustrating an example of a hardware configuration of a computer-based system in accordance with the second aspect. Steps and features that are the same or similar to corresponding steps and features previously described or shown herein are denoted by the same reference numeral as previously used for simplicity.

The computer-based system may comprise a relying party 2 and an end entity 1 connected to the relying party 2, wherein the type of connection between the two can be direct or indirect, as will be described below. A unique device key 3 may also be assigned to the end entity.

The end entity 1 may comprise a processor (CPU) 23 for performing data processing and executing software-based instructions, a storage medium 24 (HDD) for storing data to be processed and software-based instructions to be executed by the CPU 23, and a random-access memory (RAM) for temporarily storing an executing code 5 of an application 4. The end entity 1 may also comprise an input device (IN) 26 for receiving input from a user 31, an output device (OUT) 27 such as an electronic display 14 for conveying information to a user 31, and a communication interface (COMM) 28 for communicating with external devices directly or indirectly via a computer network 30.

Optionally, as shown in FIG. 9, the end entity 1 may also comprise a Key Management Module (KMM) 22 and a Pointer Authentication (PA) engine 21 as described above in relation to the first aspect, wherein the PA engine 21 may further comprise a Signature Module (SM) 20 dedicated to attestation claim signing. The KMM 22 and SM 20 may be configured so as to allow direct, secure injection of a private key 6 or random private key 15 generated by the KMM 22 into the SM 20 for signature generation.

The mentioned hardware elements within the end entity 1 may be connected via an internal bus 29 for handling data communication and processing operations.

The relying party 2 may have a similar configuration to the end entity 1. However, the relying party 2 may have more storage and processing resources to be able to serve multiple end entities 1 at once or in a sequence. Some relying parties 2 may not have all the components shown in FIG. 9 in relation with the end entity 1. For example, a relying party 2 may simply comprise a processor (CPU) 23, a storage medium 24 (HDD), a random-access memory (RAM), and a communication interface (COMM) 28 and so may not need an output (display) or user input device. It is noted that FIG. 9 is just one example of a possible hardware configuration and many other components could also be provided within the illustrated devices.

In one embodiment the relying party 2 and the end entity 1 are both included in the same physical device, connected via the internal bus 29.

In another embodiment the relying party 2 and the end entity 1 are, or are part of, physically different devices, and are connected via the communication interface (COMM) 28 either directly, or indirectly via a computer network 30.

In another embodiment the end entity 1 is provisioned with a kernel configured to performs the signature operation of the attestation claims 9.

In another embodiment the end entity 1 is provisioned with a TEE configured in a secure area of a processor 23 of the end entity 1, wherein the TEE is configured to perform the signature operation of the attestation claims 9.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

What is claimed is:

1. A computer-implemented method for attestation of Control Flow Integrity (CFI) of an application running on an end entity, the method comprising:
generating an asymmetric key pair based on executing code of said application and a device key unique to said end entity, said asymmetric key pair comprising a private key and a public key,
generating a public key certificate by signing said public key with said device key, wherein said public key certificate attests to said private key being in possession of said end entity, generating attestation claims regarding CFI of said application, signing said attestation claims by said private key, and validating the signature of said attestation claims by a relying party using said public key certificate, wherein said relying party is not part of said end entity, and wherein the generating said asymmetric key pair is based on a secure hash calculated from a text segment of the executing code of said application using a keyed-hash function.

2. A method according to claim 1, wherein said attestation claims are generated in the form of an application attestation token (AAT), said application attestation token comprising an identifier for said application, an identifier for said end entity, said public key certificate, and the signature by said private key.

3. A method according to claim 1, further comprising validating said public key certificate by said relying party before validating the signature of said attestation claims.

4. A method according to claim 1, wherein both said private key and said public key are generated as a sequence of pairs, and wherein said private key is generated as blocks of Pseudo-Random bytes in the form of $((x\_1, y\_1), \ldots, (x\_k, y\_k))$, and wherein said public key is calculated from said private key according to the formula $$((f_1(x\_1), f_1(y\_1)), \ldots, (f_1(x\_k), f_1(y\_k)),$$

where $f_1$ refers to a one-way function, and k refers to the security level.

5. A method according to claim 1, wherein the attestation claims are signed by said private key using an asymmetric signing algorithm, wherein the asymmetric signing algorithm includes one of a Rivest-Shamir-Adleman (RSA) algorithm, a Digital Signature Algorithm (DSA), or an Elliptic Curve Digital Signature Algorithm (ECDSA).

6. A method according to claim 1, wherein the generating said asymmetric key pair is further based on a random nonce value; and wherein said private key is derived from a device secret, wherein said device secret is calculated as a one-way function $f_2$ using said executing code, said random nonce value, and said device key as variables;

wherein said one-way function $f_2$ uses the QARMA cipher or a keyed-hash function.

7. A method according to claim 1, wherein said pairs of said private key and said public key are generated using Elliptic Curve Cryptography (ECC) or a Rivest-Shamir-Adleman (RSA) algorithm, the method further comprising generating an additional, random, asymmetric key pair comprising a random private key and a random public key, and generating a random public key certificate by signing said random public key with said private key using an asymmetric signing algorithm, wherein the asymmetric signing algorithm includes one of a Rivest-Shamir-Adleman (RSA) algorithm, a Digital Signature Algorithm (DSA), or an Elliptic Curve Digital Signature Algorithm (ECDSA), wherein said attestation claims are signed by said random private key.

8. A method according to claim 7, wherein said attestation claims are generated in the form of a random application attestation token (RAAT), said random application attestation token comprising an identifier for said application, an identifier for said end entity, said random public key certificate, said public key certificate, said random public key, and the signature by said private key.

9. A method according to claim 7, wherein the attestation claims are signed by securely injecting said private key or said random private key into a signature module dedicated to attestation claim signing.

10. A method according to claim 9, wherein said signature module is an extension of a Pointer Authentication (PA) engine, wherein said PA engine uses a QARMA cipher for generating a Pointer Authentication Code (PAC), and wherein, after generating said public key certificate, a one-way function $f_3$ of the private key or said random private key is set as a Pointer Authentication Key (PAK).

11. A method according to claim 10, wherein said attestation claims are signed following a Lamport one-time signature scheme wherein a signature of the bit string $m\_1 \ldots m\_k$ is $z\_1 \ldots z\_k$, where $z\_i = x\_i$ if $m\_i = 0$ and $z\_i = y\_i$ if $m\_i = 1$; and the validating the signature comprises checking that $f_4(z\_i) = f_4(x\_i)$ when $m\_i = 0$ and $f_4(z\_i) = f_4(y\_i)$ when $m\_i = 1$, where $f_4$ refers to a one-way function.

12. A method according to claim 11, wherein the QARMA cipher is used as the one-way function $f_4$.

13. A computer-based system comprising:

a relying party, and an end entity connected to said relying party, said end entity comprising a processor, a storage medium connected to said processor, and an assigned unique device key, wherein said storage medium is configured to store executing code of an application, and remote attestation instructions, wherein when said remote attestation instructions are executed by said processor the attestation instructions cause said end entity and said relying party to perform a method comprising:

generating an asymmetric key pair based on executing code of said application and the unique device key, said asymmetric key pair comprising a private key and a public key, generating a public key certificate by signing said public key with said unique device key, wherein said public key certificate attests to said private key being in possession of said end entity, generating attestation claims regarding CFI of said application, signing said attestation claims by said private key, and validating the signature of said attestation claims by the relying party using said public key certificate, wherein said relying party is not part of said end entity, and wherein the generating said asymmetric key pair is based on a secure hash calculated from a text segment of the executing code of said application using a keyed-hash function.

14. A computer-based system according to claim 13, wherein the processor is further configured to:

generate an asymmetric key pair based on said executing code, said unique device key, and an optional random nonce value, said asymmetric key pair comprising a private key and a public key; and generate a public key certificate by signing said public key with said unique device key.

15. A computer-based system according to claim 14, wherein
the processor is further configured to:
generate attestation claims regarding Control Flow Integrity (CFI) of said application in the form of an application attestation token (AAT), and
sign said attestation claims after receiving said private key from the key management module by secure injection.

16. A computer-based system according to claim 15, wherein
the processor is further configured to:
generate an additional, random, asymmetric key pair comprising a random private key and a random public key, and
generate a random public key certificate by signing said random public key with said private key using an asymmetric signing algorithm, wherein the asymmetric signing algorithm includes one of a Rivest-Shamir-Adleman (RSA) algorithm, a Digital Signature Algorithm (DSA), or an Elliptic Curve Digital Signature Algorithm (ECDSA),
and wherein said processor is further configured to
sign said attestation claims after receiving said random private key from the key management module by secure injection.

17. A method according to claim 1, wherein the keyed-hash function includes HMAC-SHA256.

* * * * *